(12) United States Patent
Read et al.

(10) Patent No.: US 8,033,789 B2
(45) Date of Patent: Oct. 11, 2011

(54) APPARATUS FOR PREVENTING ICE ACCRETION

(75) Inventors: Simon Read, Derby (GB); Alison J McMillan, Uttoxeter (GB); Eric Ravey, Kegworth (GB)

(73) Assignee: Rolls-Royce plc, London (GB)

( * ) Notice: Subject to any disclaimer, the term of this patent is extended or adjusted under 35 U.S.C. 154(b) by 1182 days.

(21) Appl. No.: 11/798,552

(22) Filed: May 15, 2007

(65) Prior Publication Data

US 2008/0075593 A1    Mar. 27, 2008

(30) Foreign Application Priority Data

May 17, 2006    (GB) .................................. 0609704.2

(51) Int. Cl.
*F01D 5/16*    (2006.01)
*F01D 5/18*    (2006.01)

(52) U.S. Cl. ........................ 416/95; 416/230; 416/241 A

(58) Field of Classification Search .................. 415/114, 415/119; 416/95, 224, 229 A, 229 R, 230, 416/241 A
See application file for complete search history.

(56) References Cited

U.S. PATENT DOCUMENTS

| | | | | | |
|---|---|---|---|---|---|
| 3,357,850 | A | * | 12/1967 | Baker | 416/229 A |
| 3,566,493 | A | * | 3/1971 | Poucher et al. | 29/889.71 |
| 4,097,193 | A | * | 6/1978 | Brunsch et al. | 416/224 |
| 5,931,641 | A | * | 8/1999 | Finn et al. | 416/229 A |
| 6,669,447 | B2 | * | 12/2003 | Norris et al. | 416/224 |
| 2005/0008492 | A1 | * | 1/2005 | Whitehead et al. | 416/229 R |

FOREIGN PATENT DOCUMENTS

| | | |
|---|---|---|
| GB | 2 011 542 A | 7/1979 |
| GB | 2 371 095 A | 7/2002 |
| GB | 2 391 270 A | 2/2004 |
| GB | 2 397 257 A | 7/2004 |
| GB | 2 418 460 A | 3/2006 |

* cited by examiner

*Primary Examiner* — Nathaniel Wiehe
(74) *Attorney, Agent, or Firm* — Jeffrey S. Melcher; Manelli Selter PLLC

(57) ABSTRACT

Aerofoils (22) of a gas turbine engine are provided with a coating (34) or filler (44) of viscoelastic material. As ice accretes on the aerofoils (22) during operation, the resulting aerodynamic stability imbalance induces vibration in the aerofoils (22). The viscoelastic material (34, 44) damps this vibration, and in so doing generates heat, which melts the ice away from the aerofoils (22). Heat-conducting members conduct the heat to regions of the component in which ice accretion is to be prevented. Alternative embodiments are described in which the pseudoelastic behaviour of a shape memory alloy (56), or eddy currents arising from the rotor blades' rotation in an axisymmetric magnetic field, are used as sources of heat.

9 Claims, 3 Drawing Sheets

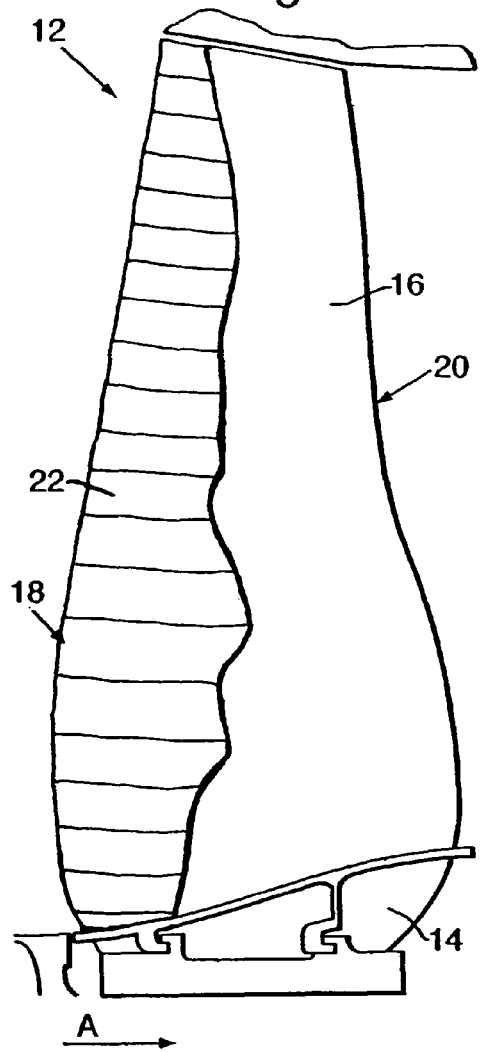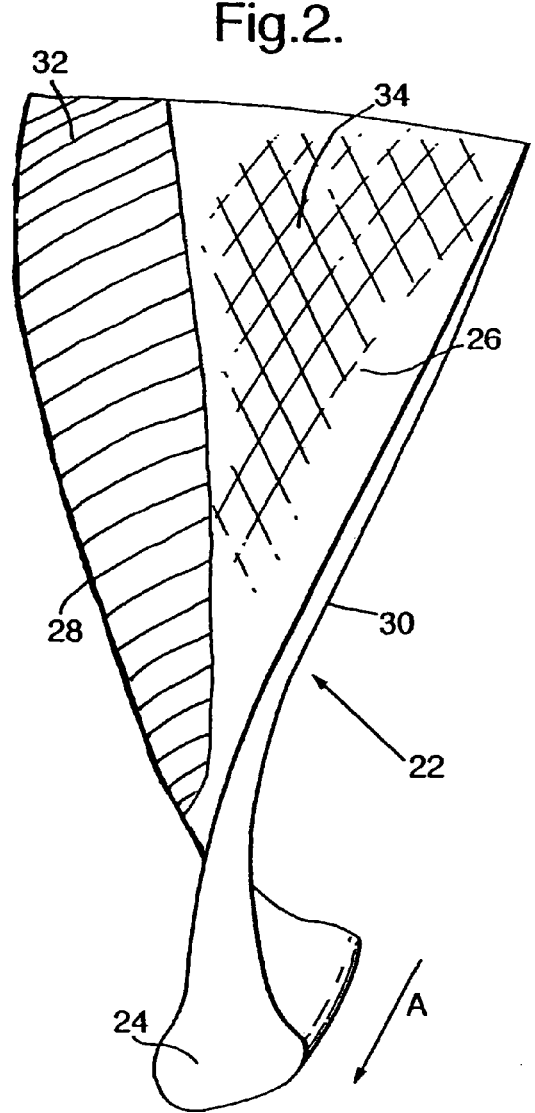

APPARATUS FOR PREVENTING ICE ACCRETION

CROSS-REFERENCE TO RELATED APPLICATIONS

This claims priority to United Kingdom Patent Application No. 0609704.2, filed 17 May 2006.

FIELD OF THE INVENTION

This invention relates to gas turbine engines, and more particularly to those components that are prone to ice accretion in use.

BACKGROUND OF THE INVENTION

Icing of the engine commonly occurs during flight through clouds containing supercooled water droplets or during ground operation in freezing fog. Ice can accumulate on the intake leading edge, the fan spinner, the fan blades and even further into the engine. Ice tends to form first on the leading edges of components, altering the airflow, reducing lift, increasing drag and adding weight. Relatively small amounts of ice can have a disproportionate effect on aircraft performance. Additionally, damage may result from ice breaking away and being ingested into the engine or hitting the acoustic material lining the intake duct.

Anti-icing operations are conducted to prevent the bonding of snow and ice to the component surfaces. Once bonded snow or ice has formed, de-icing operations are conducted to remove it. Conventional anti-icing and de-icing systems use hot air, bled from a compressor and ducted to the areas of the engine requiring de-icing, or electrical heating of the parts concerned; sometimes a combination of the two is used. Other known systems have used ducted hot oil, microwaves or chemical de-icing means.

A disadvantage of known anti-icing and de-icing systems is that they require additional hardware, in the form of bleeds and ducting for hot air, or heating elements and their associated control systems, which add weight and complexity to the engine. In addition, the need for warmed and pressurised air, or for electrical power, is detrimental to the overall performance of the engine and reduces its efficiency.

Many components of gas turbine engines are subjected to vibration in use. Not only the rotating compressor and turbine blades, but also static components such as guide vanes and nacelles, are subjected to vibrations which reduce the fatigue lives of these components and which can lead to premature cracking if the amplitude of vibration is sufficiently large.

It is known to use various methods to damp these vibrations, in which the vibrational energy is converted into another form of energy. Generally, heat is produced as a by-product of the damping process. In the design of gas turbine engines, such heat is conventionally regarded as undesirable, or its effects are ignored altogether.

There is increasing interest in forming fan blades for gas turbine engines from composite materials. This offers several advantages, among which are weight saving and the ability to tailor the mechanical properties of a blade, for example in different directions. However, ice adhesion to composite materials is not well understood, and composite materials are generally not good conductors of heat. Existing de-icing and anti-icing methods may not, therefore, be readily applicable to composite blades.

SUMMARY OF THE INVENTION

It is an object of this invention to provide an apparatus for preventing ice accretion on a component, without the need for any additional system or external energy supply. The nature of the apparatus makes it particularly suitable for use with composite fan blades. Such an apparatus will therefore substantially overcome the disadvantages of known systems.

According to the invention, there is provided an apparatus for preventing ice accretion on a component.

BRIEF DESCRIPTION OF THE DRAWINGS

Embodiments of the invention will now be described, by way of example, with reference to the attached drawings in which FIG. 1 is a general view of a gas turbine engine fan blade of known type, showing the accumulation of ice in the leading edge region;

FIG. 2 is a general view of a gas turbine engine fan blade according to a first aspect of the invention;

DETAILED DESCRIPTION OF THE INVENTION

Figure 3:
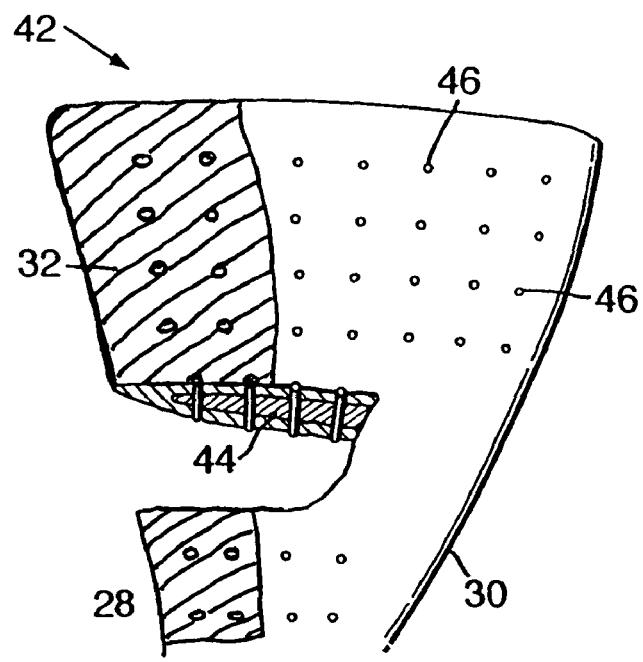
FIG. 3 is a partially cut away view of a gas turbine engine fan blade according to a second aspect of the invention.

FIG. 1 shows a conventional fan blade 12, having a root portion 14 and an aerofoil portion 16. The fan blade 12 extends, in an axial direction indicated by the arrow A, between a leading edge 18 and a trailing edge 20. In operation, ice 22 tends to accumulate near to the leading edge 18. As outlined above, the presence of this ice 22 is detrimental to the proper operation of the gas turbine engine, and the release of ice from the blade surface can cause damage further downstream in the engine.

FIG. 2 shows a composite fan blade 22 according to a first aspect of the invention, having a root portion 24 and an aerofoil portion 26. The axial direction is shown by arrow A, as in FIG. 1. A metal erosion strip 32 protects the leading edge 28 of the aerofoil portion 26 from damage by foreign objects.

An outer layer 34, comprising adhesive paint and a painted erosion resistant coating, covers the remainder of the aerofoil portion 28 of the blade 22.

In operation, under icing conditions, ice begins to accumulate on the aerofoil surface. The additional mass of the ice will upset the balance of the blade 22, promoting vibration. The presence of the ice also changes the aerodynamic shape of the blade 22, and the resulting aerodynamic instability is likely to lead to further vibration.

Any mechanisms linked to friction-type damping enable vibration to be changed into heat. Because the painted materials forming the layer 34 are viscoelastic their vibration will dissipate energy and tend to damp the vibration, and simultaneously will generate heat within the layer 34. This heat will either melt the ice, or at least will melt the interface between the ice and the blade 22, releasing it from the aerofoil portion 28 of the blade 22. The balance and the aerodynamic shape of the blade 22 are thereby restored to their intended states, and the sources of the vibration removed. The process is repeated as further ice begins to accumulate on the aerofoil surface 28.

A second embodiment is shown in FIG. 3. Here, the viscoelastic material, a synthetic mix of epoxy and polyurethane, is provided as a filler 44 for a hollow composite blade 42. Pins 46 of carbon fibre provide a heat conduction path from the viscoelastic filler 44 to the surface of the blade 42, and also add mechanical strength. The number and positions of these pins 46 may be arranged to optimise the heat transfer.

Figure 4:
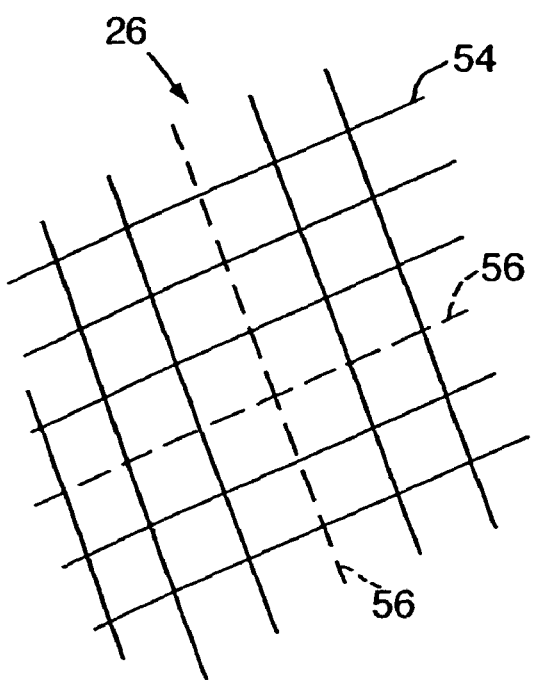
FIG. 4 is a schematic illustration of a suitable weave for the outer wrap of a fan blade, according to a third aspect of the invention.

FIG. 4 shows part of the aerofoil surface of a composite fan blade 22, as shown in FIG. 2. In this third embodiment of the invention, The weave 54 of the outer wrap of the blade 22 includes fibres 56 of a shape memory alloy (SMA).

A phenomenon known as pseudoelasticity occurs in SMAs when the alloy is completely composed of austenite (i.e. when the temperature is greater than $A_f$, the temperature at which the austenite phase finishes forming). As an increasing force is applied to the SMA, the austenite becomes transformed into martensite. This transformation occurs without any change in the temperature of the alloy. Once the loading is decreased, the martensite begins to transform back to austenite (because the temperature of the alloy is still above $A_f$) and the SMA returns to its original shape. This reverse transformation releases energy as heat (the energy that was originally put into the alloy by applying a force to it). In the embodiment of FIG. 4, vibrations in the blade 22 cause repeated loading and unloading of the SMA fibres 56, with a consequent release of energy as heat on each unloading. The fibres 56 therefore act as a source of heat.

The SMA fibres are preferably located towards the surface of the blade, because the vibration strain energy will be greatest further away from the neutral axis. To optimise the conversion of strain energy into heat, the SMA fibres may be concentrated in the areas of greatest vibration (for example, around the anti-nodes of the vibration modes). These regions of the blade may not be the same regions where ice tends to accumulate, and so the heat may have to be transferred through the blade. This may be achieved using a network of heat-conducting wires or pins (as described in connection with FIG. 3). If heat is not required in the regions where the SMA fibres are located, the SMA fibres may be insulated to maximise the heat available for transfer.

Figure 5:
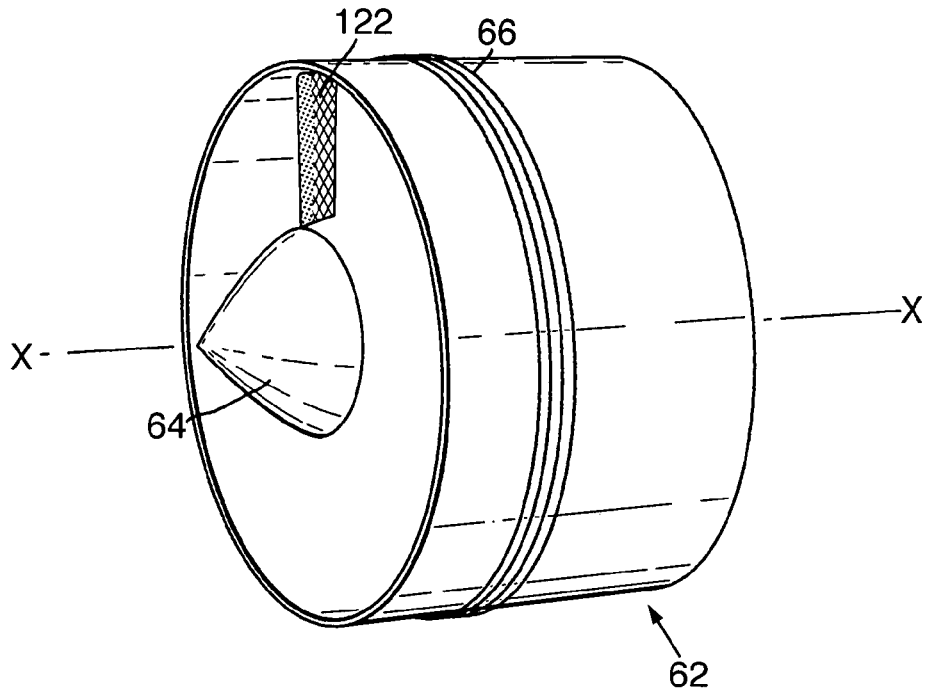
FIG. 5 is a general view of the fan case of a gas turbine engine, including an apparatus according to a fourth aspect of the invention.

FIG. 5 shows a fan case 62 of a gas turbine engine. A single fan blade 122 is shown—in a real engine there would be a circumferential array of such blades. Each blade 122 has a root portion which locates in a central hub 64. In operation, the fan blades 122 rotate about the engine axis X-X. Each blade 122 has a metallic, or electrically conducting, tip.

Around the outside of the fan case 62 are electrical windings 66. These are used, as described in UK Patent application GB 0410778.5, to generate a magnetic field around the fan assembly. The teaching of this patent application is incorporated into this specification by reference.

As explained in GB 0410778.5, the electrical windings 66 generate an axisymmetric magnetic field through which the fan blades (and, more particularly, the conducting tips of the fan blades) pass in their rotation. Provided the tips of the fan blades do not deviate from their design position and rotational path, any flux line of the axisymmetric field will always pass through the same place in any blade, and so there is no net force on any blade. Any deformation of a blade, or any deviation in its path, will cause the flux lines to move relative to the blade and a restoring force will be set up. The vibration of the blades 122 as a result of ice accretion, as described for previous embodiments, will cause such deformation and deviation, and consequently restoring forces will be set up. Heat will be generated within the blades 122 as a result of these forces, and this heat will melt the ice as described previously.

Figure 6:
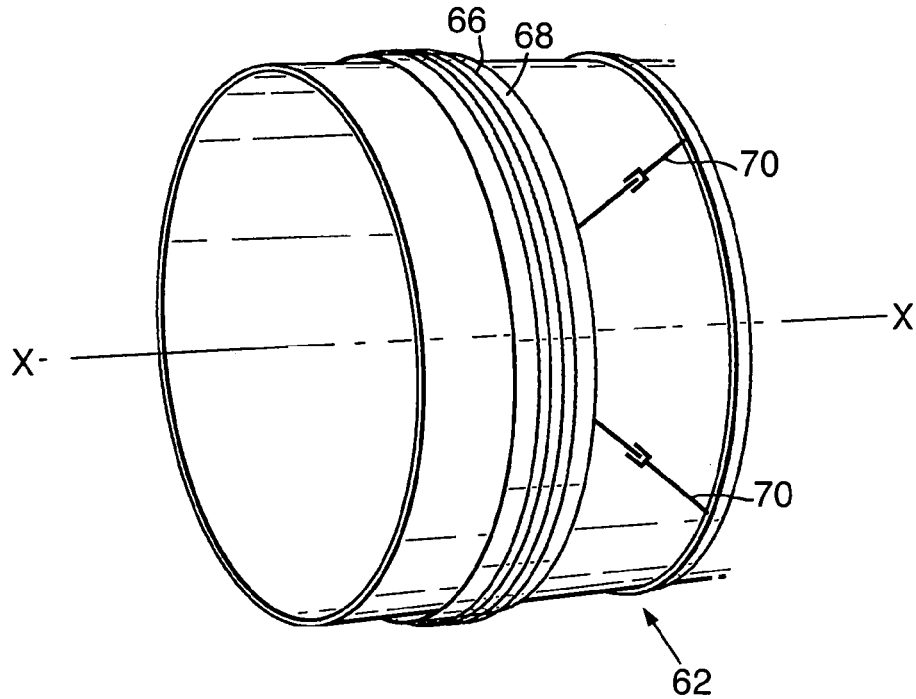
FIG. 6 is a general view of the fan case of a gas turbine engine, showing an alternative embodiment of the fourth aspect of the invention.

An alternative embodiment is shown in FIG. 6. As in FIG. 5, electrical windings 66 are arranged around the outside of the casing 62. In this embodiment, the electrical windings are arranged around an annular support 68. Actuators 70 permit the support 68 to be moved so that the support 68, and consequently also the electrical windings 66, are no longer aligned with the engine axis X-X. This will tend to induce vibration in the blades, which will generate heat to melt the ice (as described in the preceding paragraph) and may also shake off the ice directly.

As a further alternative, the electrical windings 66 shown in FIGS. 5 and 6 could be combined with fan blades having viscoelastic coatings or fillers (as shown in FIGS. 2 and 3) or having SMA inserts (as shown in FIG. 4) and the vibrations induced by the magnetic field would then lead to heating of the viscoelastic material or SMA, as explained above.

Other modifications are possible to the embodiments described, without departing from the scope of the invention.

In the embodiment of FIG. 2, for example, the viscoelastic material may be covered by a face sheet of a material with relatively high thermal conductivity. This will improve the heat transfer from the viscoelastic material into the ice layer. Alternatively, discrete strips of such a material may be overlaid on the viscoelastic material, in any desired pattern. This latter solution may provide less constraint to the viscoelastic material, and thus avoid any impairment of its performance.

In the embodiment of FIG. 3, other materials may be used for the filler 44. Instead of a synthetic mix of epoxy and polyurethane, either epoxy or polyurethane may be used alone. Polyethylene may also be used. Various materials may be added to these basic constituents, to reduce the density of the filler or to increase its toughness or stiffness. Examples of suitable additives are: microspheres (e.g. of glass, ceramic, metallic, polymer, or metallic coated ceramic or glass); solid spheres (e.g. of polystyrene or rubber); fibres (e.g. of aramid, silk, metal or carbon).

Although the invention described is particularly suitable for use with composite fan blades of gas turbine engines, it will be understood that the principles may be applied to other components, and in other types of machinery, with equally beneficial effects. For example, the invention could be applied to propellers, unducted fans, static vanes, nacelles, splitter fairings or CIAM tip treatments.

The invention claimed is:

1. An apparatus for preventing ice accretion on a component subjected in use to vibration, in which in use heat is generated by damping of the vibration, wherein the component includes at least one heat-conducting member that in use conducts the heat to a region of the component in which ice accretion is to be prevented, in which the damping is provided by a filling of viscoelastic material in at least part of the component, the heat-conducting members conduct the heat from the filling to the surface of the component, and the heat-conducting members are pins, rivets or stitches.

2. An apparatus as in claim 1, in which the damping is provided by a coating of viscoelastic material on at least part of the component.

3. An apparatus as in claim 2, in which the heat-conducting member is a face sheet covering the viscoelastic material.

4. An apparatus as claimed in claim 2, in which the heat-conducting members are strips provided on at least part of the viscoelastic material.

5. An apparatus as in claim 2, in which the viscoelastic material comprises one or more of epoxy, polyurethane and polyethylene.

6. An apparatus as in claim 2, in which the viscoelastic material includes one or more additives selected from: microspheres, coated microspheres, solid spheres, fibres.

7. An apparatus as in claim 2, in which the component is a component of a gas turbine engine.

8. An apparatus as in claim 7, in which the component is a fan blade, propeller, unducted fan blade, nacelle or splitter fairing.

9. An apparatus for preventing ice accretion on a component subjected in use to vibration, in which in use heat is generated by damping of the vibration, wherein the component includes at least one heat-conducing member that in use conducts the heat to a region of the component in which ice accretion is to be prevented, in which the damping is provided by a coating of viscoelastic material on at least part of the component and in which the glass transition temperature of the viscoelastic material is optimised to gibe maximum heating at the operating temperature of the component where icing is most likely to occur.

\* \* \* \* \*